United States Patent [19]

Nurse et al.

[11] Patent Number: 5,263,111
[45] Date of Patent: Nov. 16, 1993

[54] OPTICAL WAVEGUIDE STRUCTURES AND FORMATION METHODS

[75] Inventors: James Nurse, San Jose; John P. Arrington, Belmont, both of Calif.

[73] Assignee: Raychem Corporation, Menlo Park, Calif.

[21] Appl. No.: 841,956

[22] Filed: Feb. 26, 1992

Related U.S. Application Data

[62] Division of Ser. No. 686,230, Apr. 15, 1991, abandoned.

[51] Int. Cl.[5] .......................... G02B 6/00; G02B 6/36
[52] U.S. Cl. .................................................. 385/130
[58] Field of Search ....................... 385/47, 48, 49, 52, 385/130, 131

[56] References Cited

U.S. PATENT DOCUMENTS

| | | | |
|---|---|---|---|
| 4,423,922 | 1/1984 | Porter | 385/47 X |
| 4,447,118 | 5/1984 | Mulkey | 385/47 X |
| 4,630,255 | 12/1986 | Gouali et al. | 385/47 X |
| 4,707,064 | 11/1987 | Dobrowolski et al. | 385/47 X |
| 4,904,036 | 2/1990 | Blonder et al. | 385/49 X |
| 4,908,333 | 3/1990 | Shimokawa et al. | 437/195 |
| 4,912,022 | 3/1990 | Urquhart et al. | 430/396 |
| 4,932,743 | 6/1990 | Isobe et al. | 385/130 X |

OTHER PUBLICATIONS

Selvaraj et al., "Integrated Optical Waveguides in Polyimide for Wafer Scale Integration", *IEEE J. Lightwave Technol.*, vol. 6, No. 6 (Jun. 1988), pp. 1034–1044.

Kokubun et al., "Silicon Optical Printed Circuit Board for Three-Dimensional Integrated Optics," *Electron, Lett.*, vol. 21, No. 11 (1985), pp. 508–509.

Hartman et al., "Radiant Cured Polymer Optical Waveguides on Printed Circuit Boards for Photonic Interconnecton Use," *Appl. Optics*, vol. 28, No. 1 (Jan. 1989), pp. 40–47.

Sullivan et al., "Guided-wave Optical Interconnects for VLSI Systems," *SPIE vol. 881 Optical Computing and Nonlinear Materials* (1988), pp. 172–176.

Sullivan, "Optical Waveguide Circuits for Printed Wire-Board Interconnections," *SPIE vol. 994 Optoelectronics Materials, Devices, Packaging and Interconnects II* (1988), pp. 92–100.

Grande et al., "One-Step Two-Level Etching Technique for Monolithic Integrated Optics," *Appl. Phys. Lett.*, vol. 51, No. 26 (Dec. 1987), pp. 2189–2191.

Hartmann et al., "Board Level High Speed Photonic Interconnections: Recent Technology Developments," *SPIE vol. 994 Optoelectronic Materials, Devices, Packaging and Interconnections II* (1988), pp. 57–64.

Hartman, "Digital High Speed Interconnects: A Study of the Optical Alternative," *Optic, Eng.* vol. 25, No. 10 (1986) pp. 1086–1102.

*Primary Examiner*—Akm E. Ullah
*Attorney, Agent, or Firm*—Herbert G. Burkard; Yuan Chao

[57] ABSTRACT

A method is provided for forming an optical waveguide structure upon a substrate in accordance with the steps of: (a) forming a layer of base coat material upon the substrate, (b) forming a layer of cladding material having a predetermined refractive index upon the base coat layer, (c) applying a channel waveguide pattern defining structure to the layer of cladding material, (d) applying a patterning agent to transfer the pattern of the channel waveguide pattern defining structure to a predetermined depth or depths into the cladding material layer to define a waveguide trench pattern, (e) removing any remaining residue of channel waveguide pattern defining structure, (f) forming a thick coat layer of waveguide material having a higher refractive index than the cladding material onto the cladding material and into the waveguide trench pattern, (g) planarizing the waveguide material substantially to the plane of a topmost surface of the cladding material in order to reduce the thickness of the thick coat layer, and (h) forming a layer of additional cladding material to encapsulate the waveguide material in the waveguide trench pattern. An out-of-plane mirror can be used to couple two different layers together optically. A lens element can be used for collimating light reflected by the out-of-plane mirror.

9 Claims, 10 Drawing Sheets

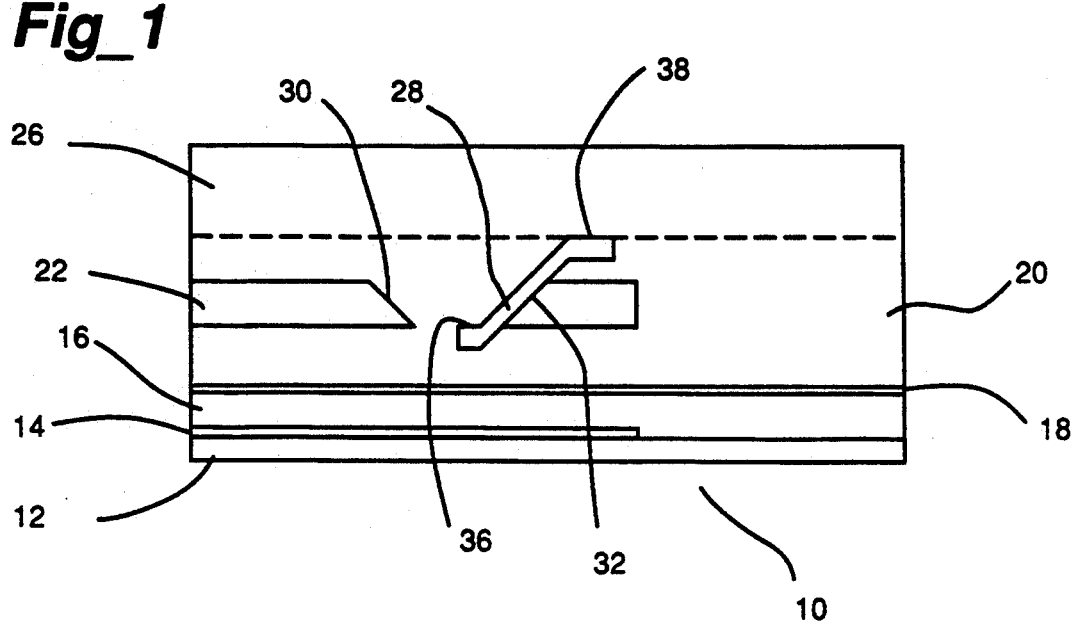
Fig_1
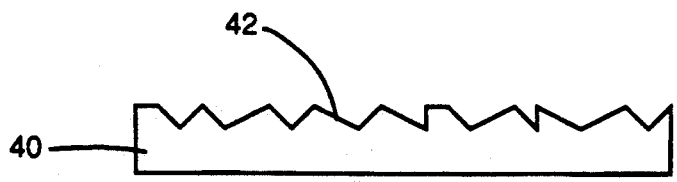
Fig_2A
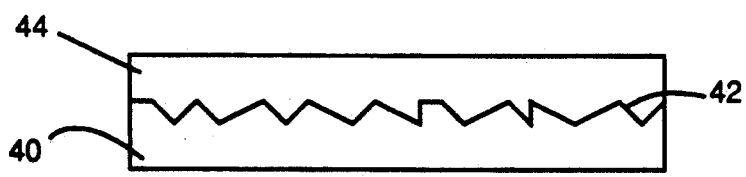
Fig_2B
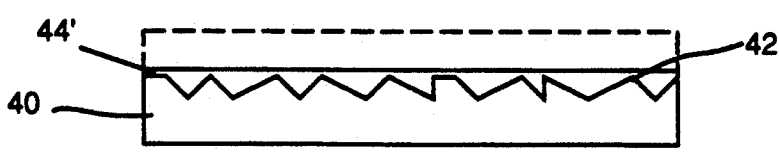
Fig_2C

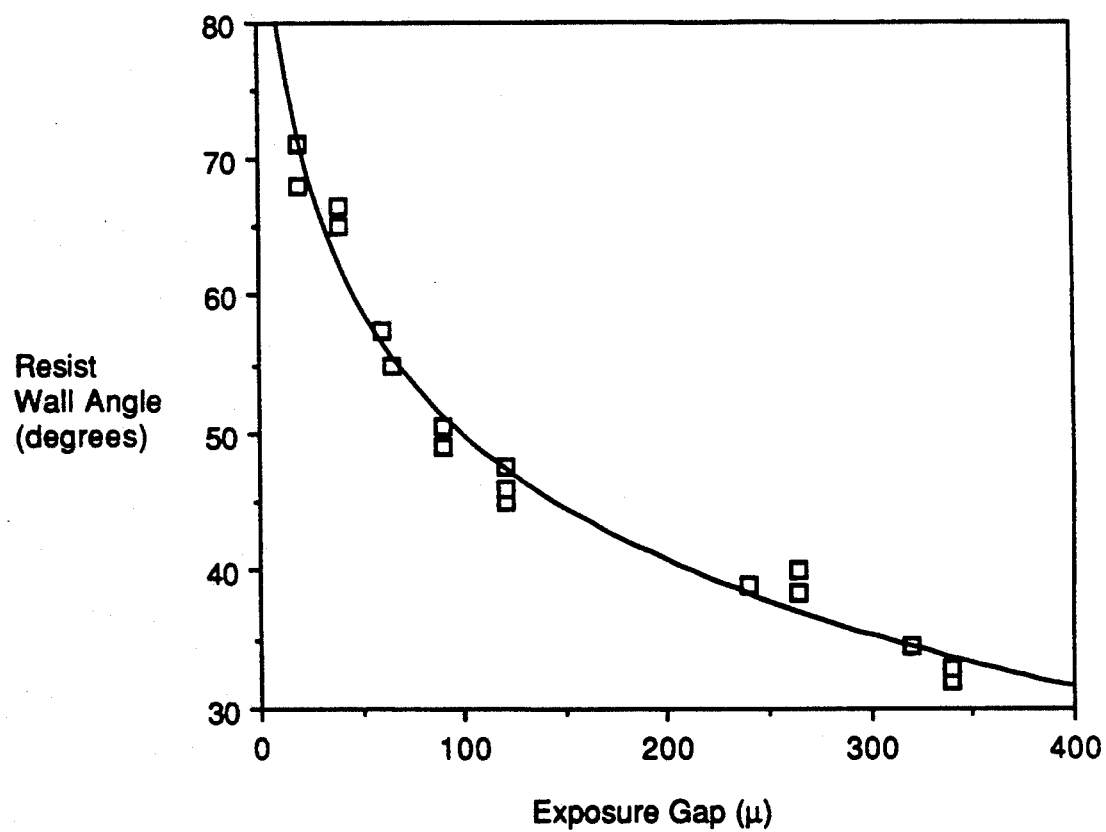
Fig_3

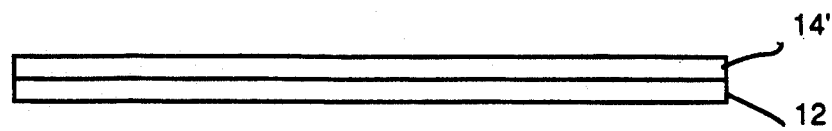
*Fig_4*
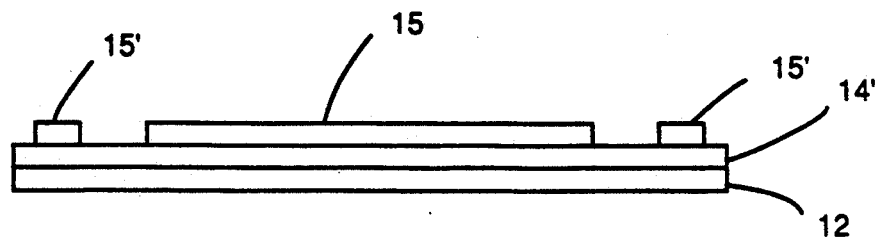
*Fig_5*
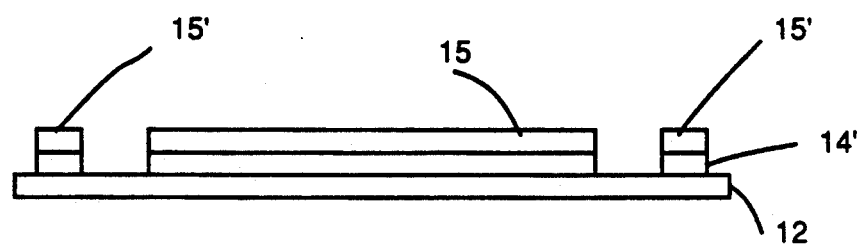
*Fig_6*
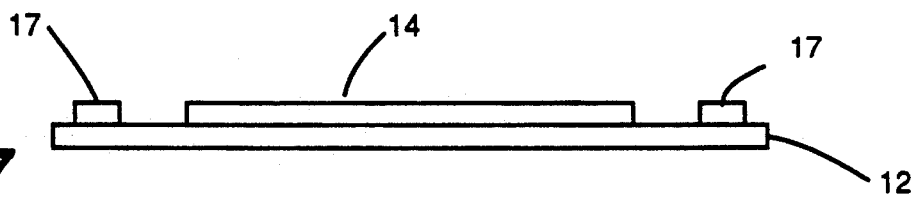
*Fig_7*
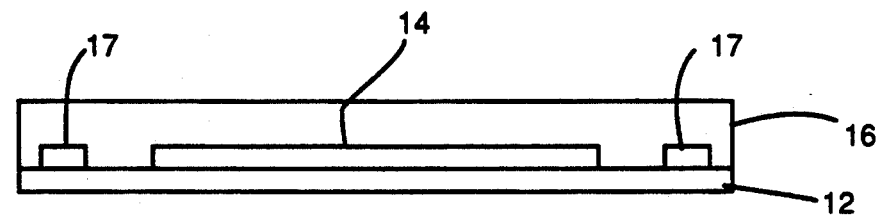
*Fig_8*
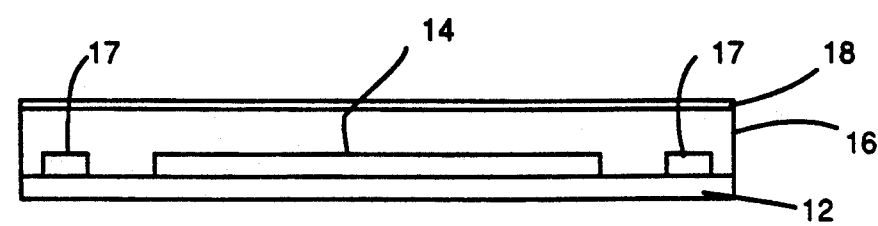
*Fig_9*

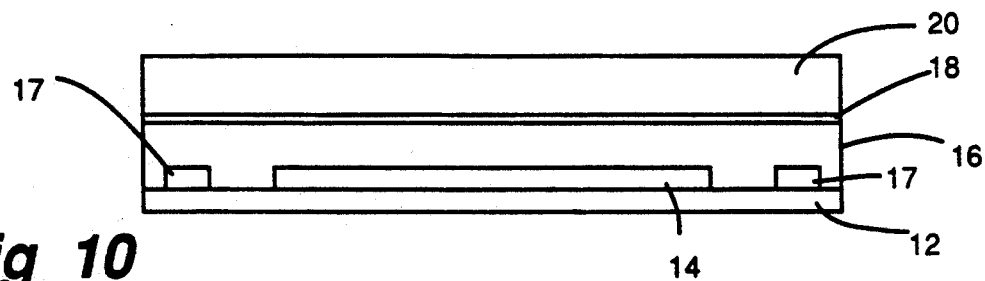
Fig_10
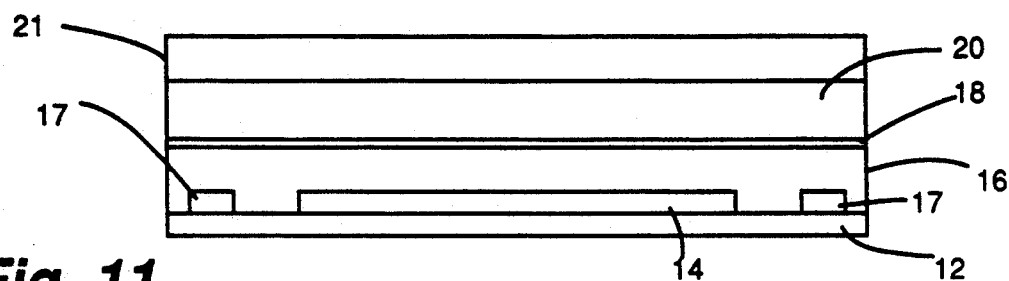
Fig_11
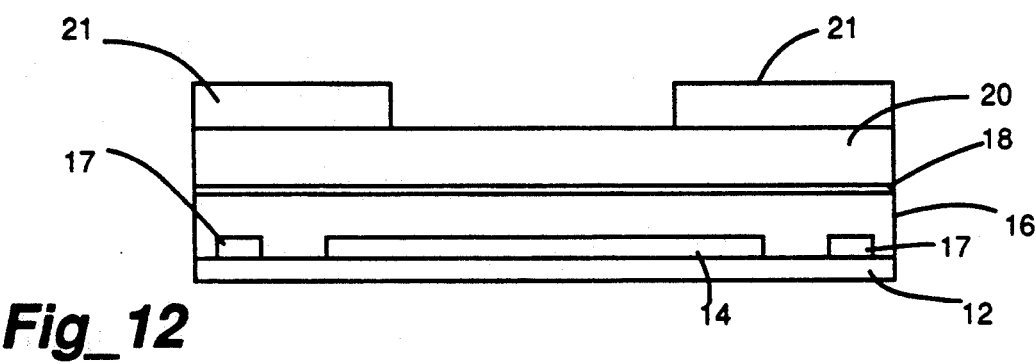
Fig_12
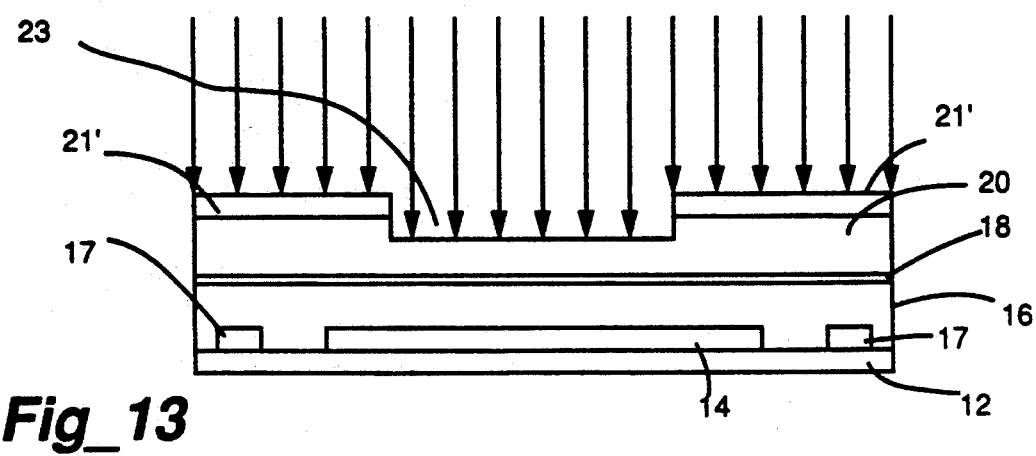
Fig_13

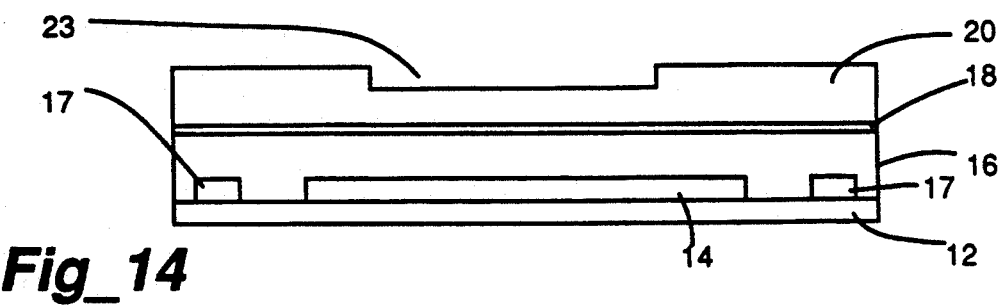
Fig_14
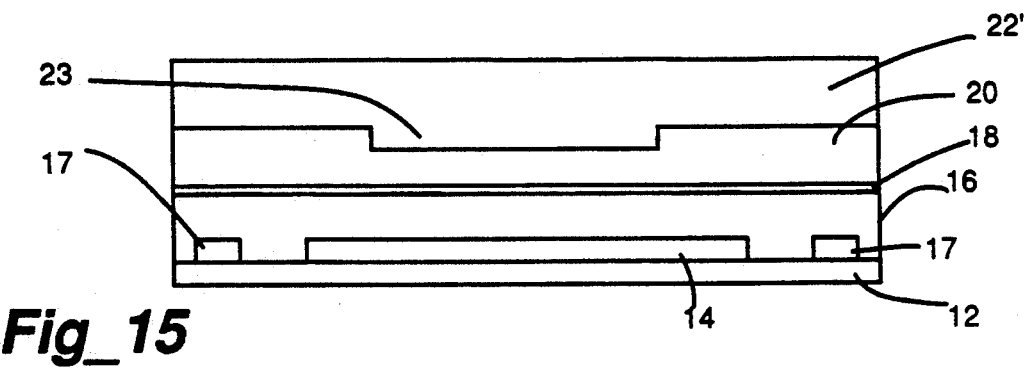
Fig_15
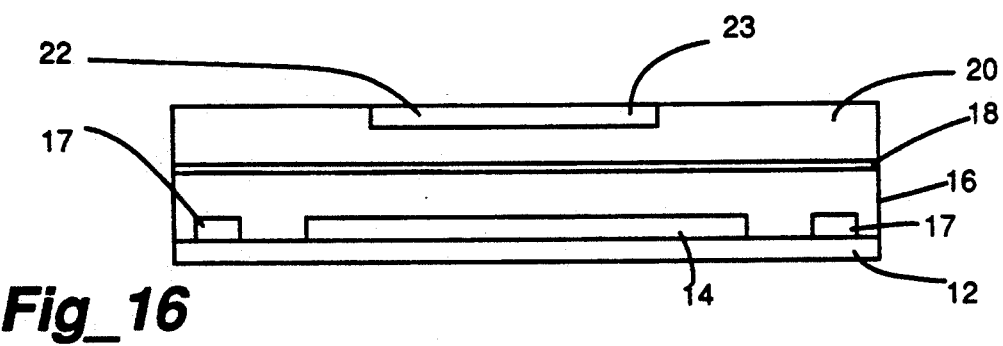
Fig_16
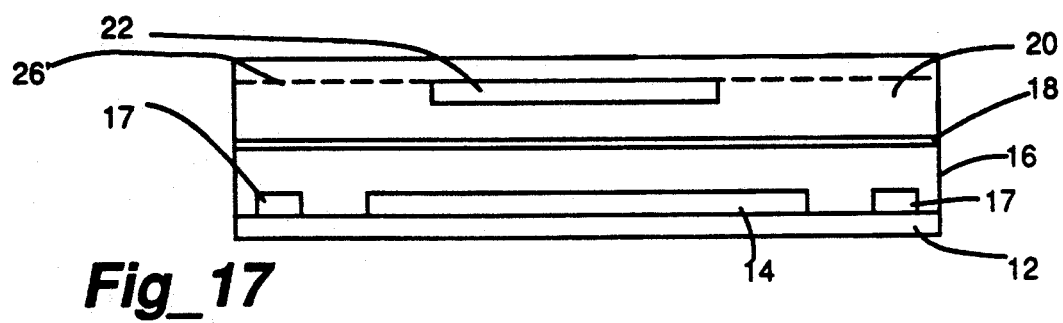
Fig_17

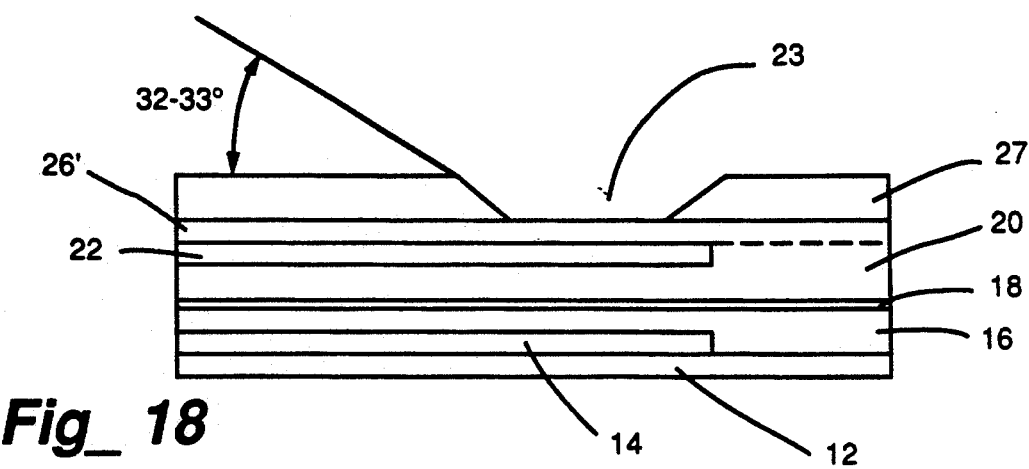
*Fig_18*
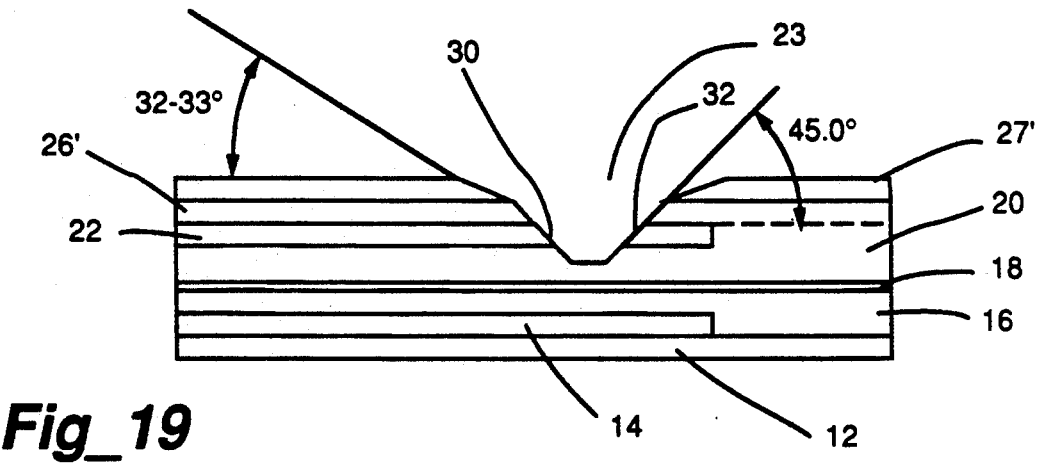
*Fig_19*
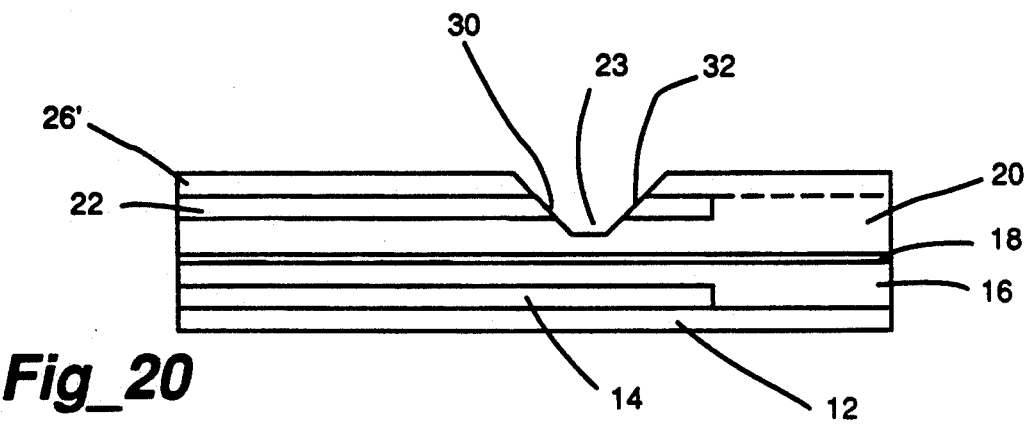
*Fig_20*

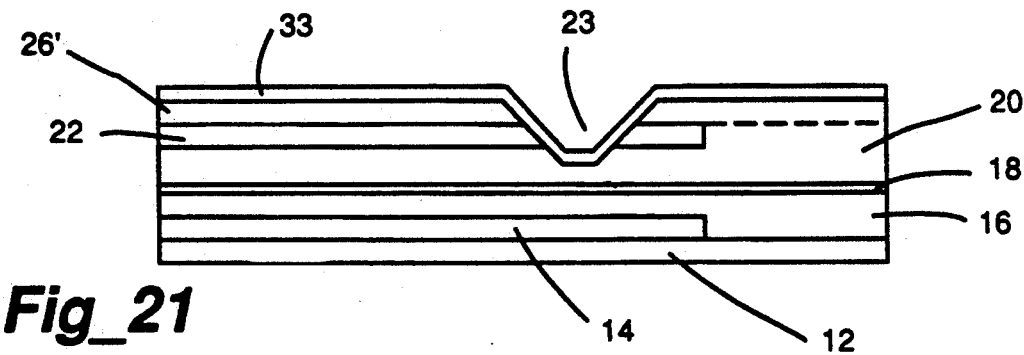
Fig_21
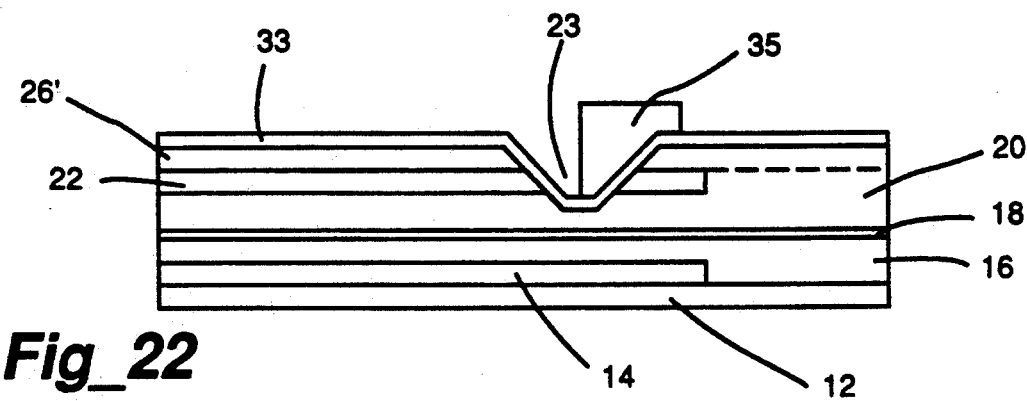
Fig_22
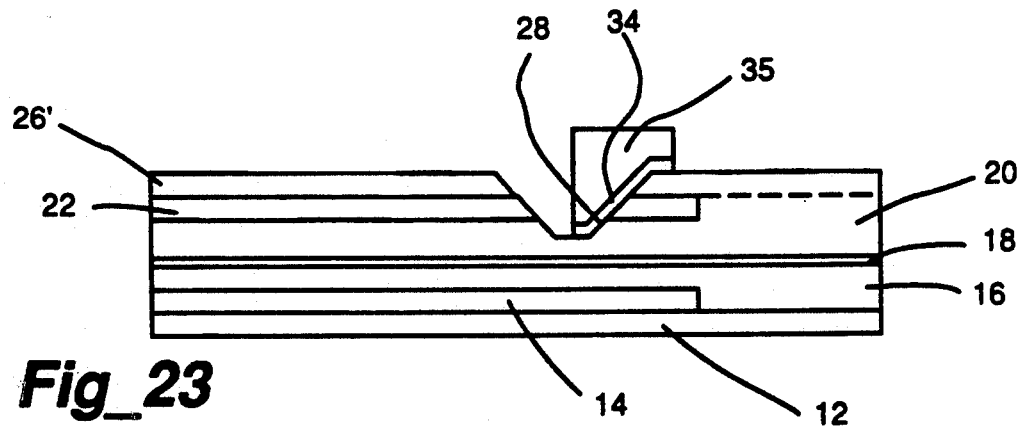
Fig_23
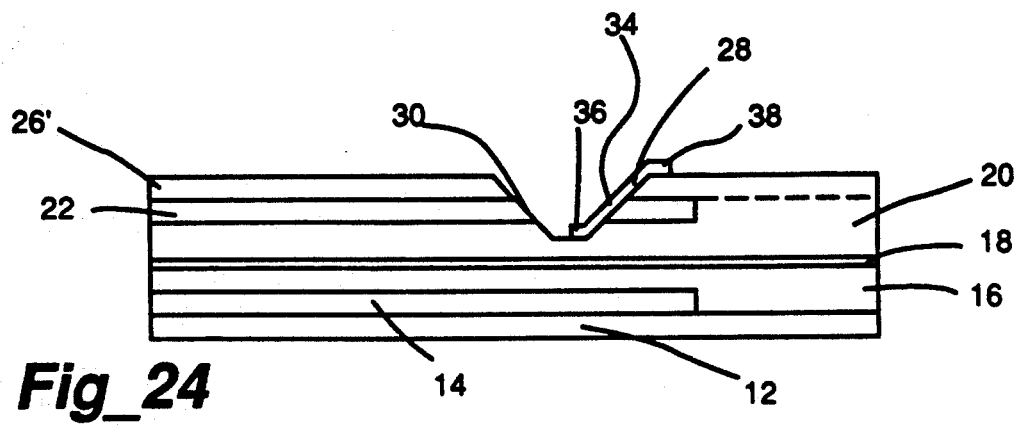
Fig_24

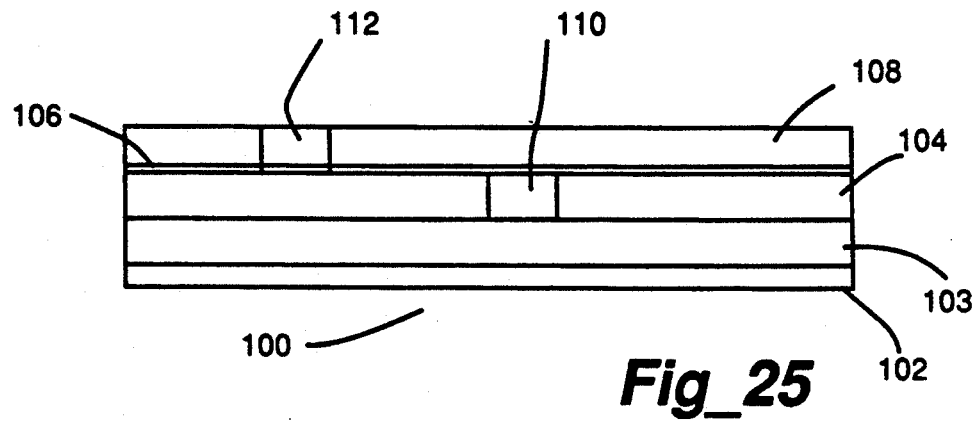
*Fig_25*
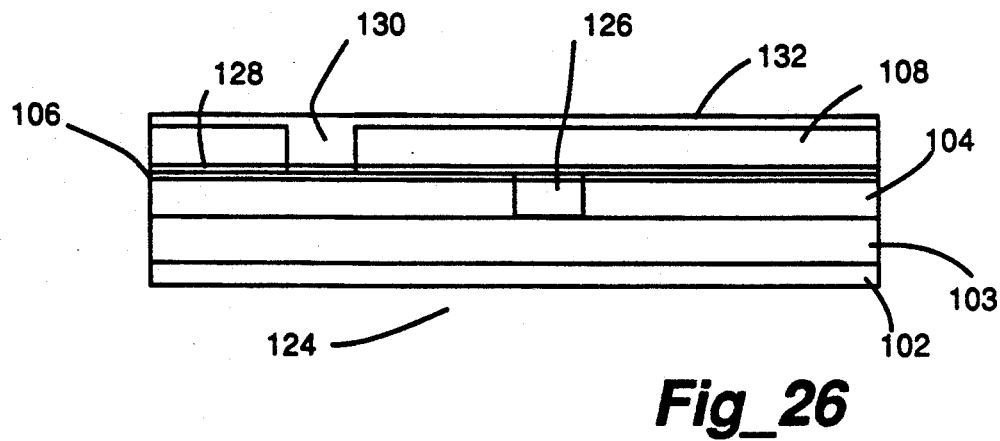
*Fig_26*
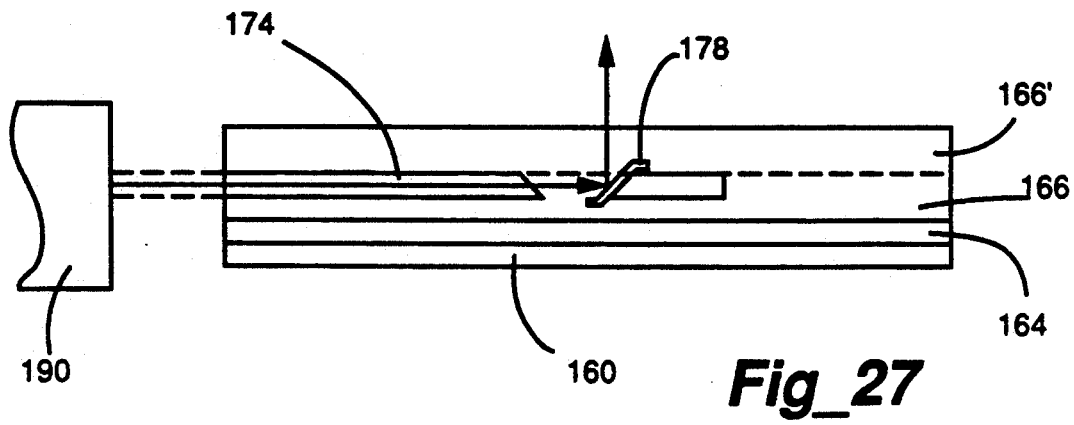
*Fig_27*

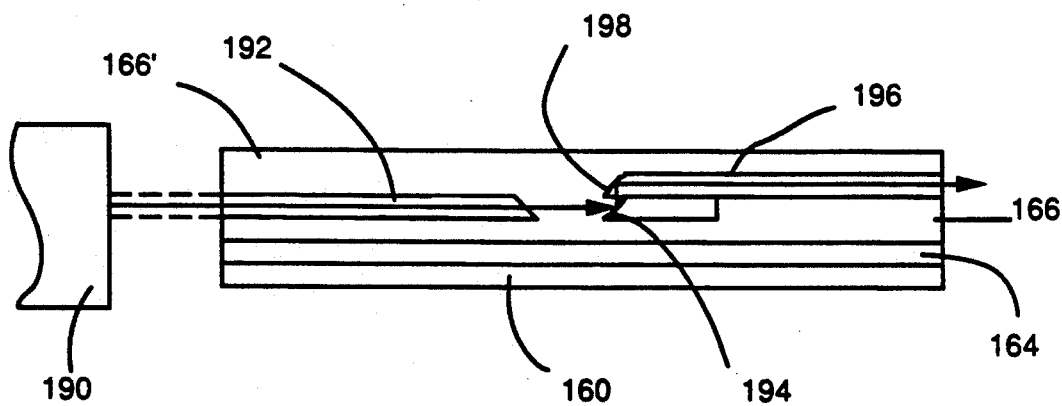
Fig_28a
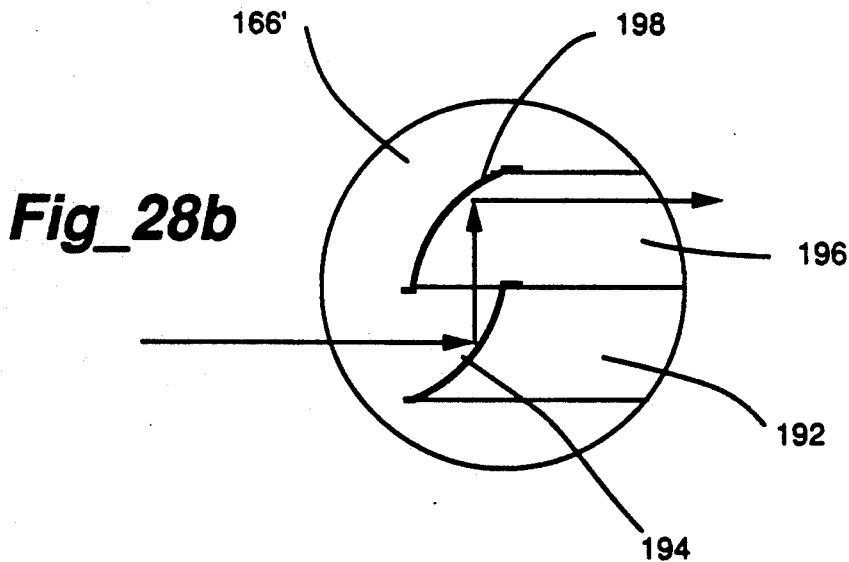
Fig_28b
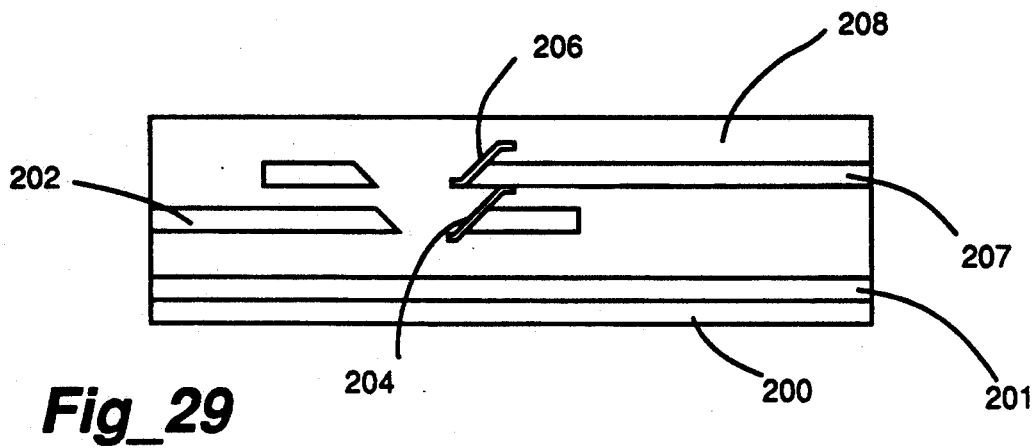
Fig_29

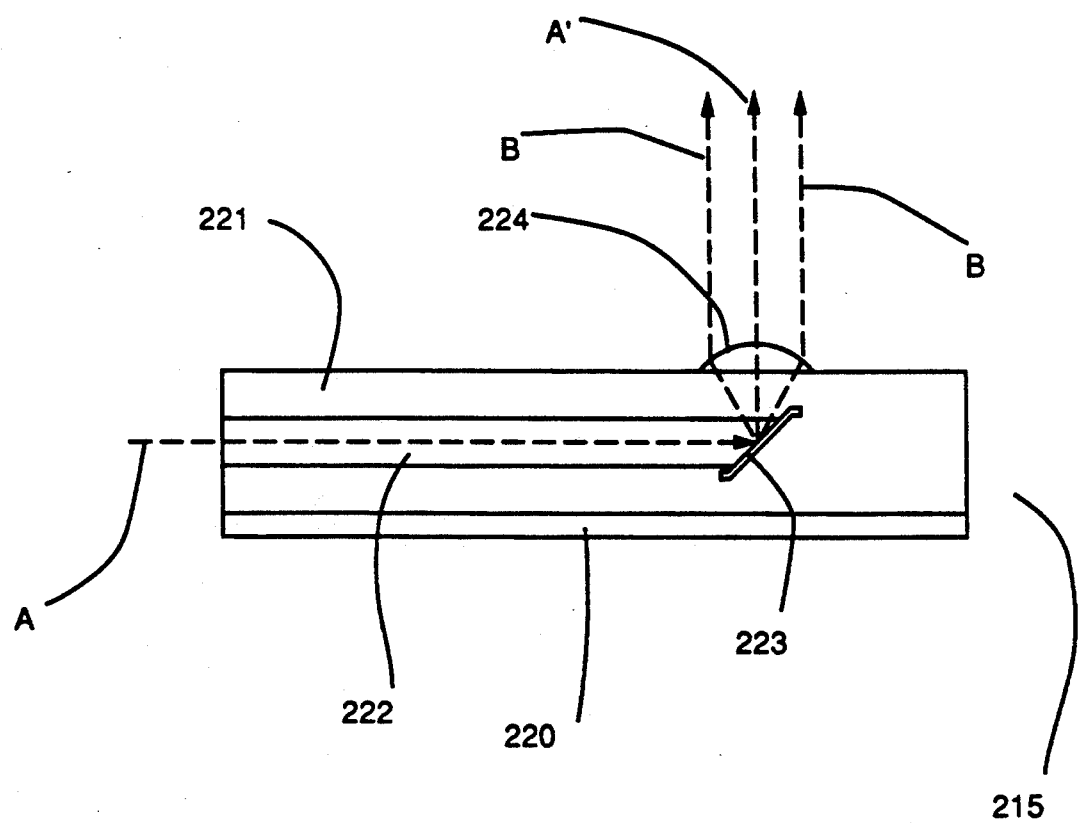
Fig_30

OPTICAL WAVEGUIDE STRUCTURES AND FORMATION METHODS

CROSS-REFERENCE TO RELATED APPLICATIONS

This application is a continuation-in-part of application Ser. No. 07/686,230, filed Apr. 15, 1991, now abandoned, the disclosure of which is incorporated herein by reference.

FIELD OF THE INVENTION

The present invention relates to optical waveguide structures and methods for making the same.

BACKGROUND OF THE INVENTION

The fabrication of waveguide structures for guiding electromagnetic energy, particularly in optoelectronic type devices, is of considerable interest. Optical interconnections offer advantages over their electrical counterparts, such as large signal bandwidths and reduced propagation delay. When circuit arrays are formed at the wafer scale level of integration, the advantages of optical interconnections become even more pronounced.

Much of the prior work which has been done on optical waveguide structures utilizes silica as the guiding medium. Silica is highly transmissive in the infrared region between 1.2 and 1.6μ, which makes it an attractive medium for coupling to existing single mode optical fibers. In addition, processing techniques for silica structures based upon integrated circuit fabrication technologies are well understood.

Polymeric waveguide systems have also been studied in the prior art. Those studies have included consideration of low loss multilayer integrated optical waveguides using optically transparent polyimide as an embedding material and as a waveguide dielectric. Polymer-based structures also lend themselves well to many integrated circuit processing techniques and may be custom tailored for specific applications.

Aspects of semiconductor fabrication processes which are particularly of interest in the formation of optical waveguide structures are discussed in U.S. Pat. No. 4,912,022 (1990) to Urquhart et al., and U.S. Pat. No. 4,908,333 (1990) to Shimokawa et al. The type of sloped profile disclosed in U.S. Pat. No. 4,912,022 is stated to frequently exhibit a substantially Gaussian shape which is related to the random nature of the scattered radiation used to expose the resist.

There are five major groups of relevant processing steps: metal deposition upon substrates and wafers, wet etch of sputtered metals, thick- and thin-coated photolithographic graphic patterning, spin coating and ultraviolet light ("UV") cure of acrylic materials, and dry etch of acrylic materials using a reactive ion etch ("RIE") plasma.

Selvaraj et al., in, "Integrated Optical Waveguides in Polyimide for Wafer Scale Integration", *IEEE Journal of Lightwave Technology*, Vol. 6, No. 6, June 1988, pp. 1034-1044, disclose ion milling techniques for constructing mirrors and vertical vias enabling optical interconnection between layers of a multi-layer wafer scale structure.

Kokubun et al., in "Silicon Optical Printed Circuit Board for Three Dimensional Integrated Optics" in *Electronics Letters*, Vol. 21, No. 11, (1985), pp. 508-9, disclose forming a Vee-groove in a (100)-oriented crystalline silicon substrate by use of a sputtered silicon dioxide mask and a photomask of stripes aligned parallel or perpendicular to the <111> crystalline direction. An orientation dependent wet etch process creates Vee grooves. The grooves are cladded with a silicon dioxide film deposited by RF sputtering, and gold film is deposited on the (111) plane at the end of the Vee groove to enhance optical reflection. A mixture of styrene and benzyl methacrylate monomers is placed into the Vee grooves and cured to form the waveguide core. The authors also proposed trying unidirectional dry-etching techniques, such as reactive ion etching, in order to form reflectors with 45 degree angles to facilitate stacking of the plural substrates in their proposed approach.

Hartman et al., in "Radiant Cured Polymer Optical Waveguides On Printed Circuit Boards for Photonic Interconnection Use, *Applied Optics*, Vol. 28, No. 1, January, 1989, pp. 40-47 describe fabrication and evaluation of patterned channel waveguides formed on printed circuit card material by use of ultraviolet cured adhesive films as channel waveguide material and substrate patterning with standard photographic masks. Since the waveguide materials are formulated as adhesives, adhesion to the substrate was said not to be problem so long as a complete curing of the films occurs and film thickness does not exceed 250 μ. Waveguide patterning on silicon or glass substrates using an argon-ion laser is also discussed in this article. Channel waveguide widths of 3,200μ are proposed as a reasonable target or goal, suggesting formation of large, multimode optical waveguide structures.

Sullivan et al., in "Guided-wave Optical Interconnects for VLSI Systems", *SPIE Vol. 881 Optical Computing and Nonlinear Materials*, 1988, pp. 172-176 describe low loss optical interconnects made from polyimides. A direct write technique using negative-acting photosensitive polyimide is proposed to improve the smoothness of the resultant sidewalls. The authors set forth the principal requirements of an integrated waveguide technology in these terms: "low-loss signal propagation (<0.1 dB/cm), simple and reproducible fabrication over very large areas (<20 in²), easy fabrication of all routing and distribution circuit components, environmental stability (temperature, humidity and radiation), compatibility with multichip (MCP) packaging and printed wire board (PWB) fabrication, easy coupling at all interfaces (emitter/detector, fiber, waveguide-waveguide), and ability to transmit high power without channel degradation."

Sullivan, in "Optical Waveguide Circuits for Printed Wire-Board Interconnections", *SPIE Vol. 994 Optoelectronic Materials, Devices, Packaging, and Interconnects II*, (1988) pp. 92-100, discloses optical and electrical signal paths provided on the same substrate. The optical waveguides are formed by optical quality polyimide covered with a silicon dioxide cladding. Reactive ion etching through a two layer mask of photoresist and plasma-deposited silicon dioxide is used to form the waveguide channel. Right angle bends, branches, and crossover components for signal routing and distribution are also discussed.

Grande, et al., in "One-Step Two-Level Etching Technique for Monolithic Integrated Optics", *Applied Physics Letters*. Vol. 51, No. 26, Dec. 28, 1987, pp. 2189-2191, propose the use of an erodable mask to produce both shallow etching and deep etching of the substrate in order to accommodate dissimilar optical devices on the same substrate.

In the fabrication of polymer based channel waveguides and rib waveguide structures, it is advantageous and often necessary to have extremely thin polymer films incorporated into the completed structure. Various semiconductor-type processing methods may be used for creating thin films out of the materials which are used to make polymer resin based waveguide structures. One method is spin-coating, in which a fluid polymer precursor resin material is dispensed onto a wafer. The wafer is spun at a rotational speed and for a duration selected to yield a desired film thickness. Another method of creating thin films is plasma etching. For organic materials, an oxygen plasma applied under isotropic conditions is used to reduce evenly a thick polymer film to a desired thickness.

Spin-coating and oxygen plasma etching have been combined when it is desired to planarize a rough or uneven surface. In one case a film of appropriate thickness is spin-coated onto a rough surface. Providing the etch rates of the underlying layer and the spin-coated layer are equal, the isotropic oxygen plasma may then be used to reduce uniformly the overall film thickness, leaving behind a smoothly surfaced (planarized) film of the underlying material. In another case, when a thin spin-coated film will not planarize an uneven surface, a very thick film may be spin-coated onto the wafer and then reduced to the required thickness by using an isotropic oxygen plasma.

Materials for forming the channel waveguide media must satisfy a number of requirements. Among the properties such materials must possess are: high optical transparency at the wavelengths of interest (especially 550–1550 nm), rapid and complete cure characteristics, workable fluid phase precursor consistencies prior to placement and cure, and selectable/controllable refractive indices. These materials must also have the property of adhering securely to substrates, such as polyimide, gallium arsenide, indium phosphide, silicon nitride, and crystalline silicon. They must also show good interlayer adhesion. Ultraviolet light curable polymers have been proposed in the prior art for channel waveguide structures.

Heretofore, the adhesion issue has been problematic. Not only is it difficult to adhere to the various substrates noted above, but interlayer adhesion between ultraviolet light curable layers is generally recognized as a major problem. Thus, a hitherto unsolved need has remained for fabrication methods, conditions and materials which manifest the requisite physical and optical properties while also manifesting greater interlayer adhesion and greater adhesion to difficult substrates.

The present invention provides significant and unexpected improvements applicable to this technology, particularly in the formation of very narrow, single optical mode waveguide structures and out-of-plane mirrors.

SUMMARY OF THE INVENTION

A general object of the present invention is to provide methods for forming optical waveguide structures and the structures realized from these methods, such that limitations and drawbacks of prior methods and structures are overcome., especially in respect of single mode channel waveguide structures in polymer films such as polyimide films and upon substrates, such as UV cured polymer substrates, indium phosphide, gallium arsenide, quartz, and crystalline silicon.

Another specific object of the present invention is to provide methods for forming controlled structures and contours relating to optical waveguides, optical splitters, out-of-plane mirrors, and like optoreflective structures or surfaces, within polymeric media.

A further specific object of the present invention is to provide methods for forming optical waveguide trenches (or mesa sidewalls of rib structures) in polymer substrates or layers which are smoother than heretofore realized and which result in less dispersion and loss of light signal energies.

One more specific object of the present invention is to employ erodable masks of patterned photoresist material in the formation of structures, trenches, surfaces and contours including ribs or mesa-plateaus, and photoreflective surfaces in polymer substrates in a manner which overcomes limitations and drawbacks of the prior art.

Yet another specific object of the present invention is to employ sacrificial, erodable mask-patterned thick organic photoresist material for defining structures, trenches, and surfaces of organic substrates, useful for example in providing channel waveguide structures.

A still further specific object of the present invention is to provide new and improved methods for forming out-of-plane mirrors and optical beam splitters, particularly ones which are suitable for and optically addressed to narrow, single mode optical channel waveguide structures.

Yet another specific object of the present invention is to provide methods for improving interlayer adhesion within layered structures formed to include optical channel waveguides and out-of-plane mirrors, for example.

Yet another specific object of the present invention is to provide methods for using polymer optical waveguide dielectric precursor materials and formulations which, when placed and cured in accordance with these methods, result in vastly improved optical channel waveguide structures and related structures such as out-of-plane mirrors, for example.

In accordance with the principles of the present invention, a method is provided for forming an optical waveguide structure upon a substrate. The method includes the steps of providing a substrate, forming a cladding layer of optical cladding material upon the substrate, forming the optical waveguide structure by using an erodable mask and subsequent etch, thereby defining the location and volume of the optical waveguide structure relative to the cladding layer, and placing optical waveguide material at the location and within the volume of the optical waveguide structure.

In one aspect of the present invention, a further step of forming an out-of-plane optoreflective mirror structure addressed to the optical waveguide structure is carried out.

In another more detailed aspect of the present invention directed toward the formation of a channel waveguide structure, the method comprises the steps of:

providing a substrate, forming a layer of base coat material upon the substrate, forming a layer of cladding material having a predetermined refractive index upon the base coat layer, applying a channel waveguide pattern defining structure to the layer of cladding material, applying a patterning agent to transfer the pattern of the channel waveguide pattern defining structure to a predetermined depth or depths into the cladding material layer to define a waveguide trench pattern, removing any remaining residue of channel waveguide pattern defining structure, forming a thick coat layer of waveguide material having a higher refractive index than the cladding material onto the cladding material and into the waveguide trench pattern, planarizing the waveguide material substantially to the plane of a topmost surface of the cladding material in order to reduce the thickness of the thick coat layer, and forming a layer of additional cladding material to encapsulate the waveguide material in the waveguide trench pattern.

As one aspect of this method, the step of applying a channel waveguide pattern defining structure to the layer of cladding material comprises the steps of coating an erodable photoresist material upon the cladding material and patterning the coated photoresist in order to define the channel waveguide pattern.

As one more aspect of the present invention, the patterned photoresist material is eroded during the step of applying the patterning agent means.

As yet another aspect of the present invention, the step of applying a patterning agent to transfer the pattern of the channel waveguide pattern defining structure to predetermined depth into the cladding material comprises the step of applying a plasma dry etch from an anisotropic source.

As one more aspect of the present invention, the step of forming a thick coat layer of waveguide material onto the cladding material and into the waveguide trench pattern comprises the steps of coating an uncured acrylic waveguide material to form the thick coat layer and curing the thick coat layer by exposure to ultraviolet light energy.

As still one more aspect of the present invention, the step of planarizing the waveguide material substantially to the plane of a topmost surface of the cladding material comprises the step of applying an isotropically sourced plasma dry etch to erode the waveguide material.

As another aspect of the present invention, the steps of applying a channel waveguide pattern defining structure to the layer of cladding material, and applying a patterning agent to transfer the pattern of the channel waveguide pattern defining structure to a predetermined depth or depths into the cladding material layer to define a waveguide trench pattern, comprise the additional step of defining an out-of-plane mirror location in the waveguide trench pattern, and comprising the further step of forming an out-of-plane mirror at the said location. As a related aspect, the step of forming an out-of-plane mirror at the said location in the waveguide trench pattern comprises the steps of:

forming a reflective coating upon the patterned cladding material layer, forming a mirror pattern defining structure at the said location to protect the reflective coating thereat, removing the reflective coating except at the said location, and removing the mirror pattern defining structure at the said location to expose the reflective coating thereby providing the out-of-plane mirror.

As one facet of the present invention an optical channel waveguide structure is formed on a substrate in accordance with the foregoing method.

As another facet of the present invention an optoreflective structure (e.g. out-of-plane mirror) for changing direction of an optical signal following a path defined by an optical waveguide structure comprises a transverse gap across the waveguide structure so as to present to the optical path a forward surface and a rearward surface, an optoreflective surface material, such as a thin reflective film, for example, covering at least a substantial portion of the rearward surface for changing the direction of the optical signal, whereby a portion of the forward surface lying in the path transmits the optical signal without substantial redirection or scattering thereof.

As aspects of this facet of the invention, the optoreflective surface may be substantially planar or concave with respect to the optical path.

These and other objects, advantages, aspects and features of the present invention will be more fully understood and appreciated by those skilled in the art upon consideration of the following detailed description of preferred embodiments, presented in conjunction with the accompanying drawings.

BRIEF DESCRIPTION OF THE DRAWINGS

FIG. 1 is a greatly enlarged, diagrammatic side view in elevation and section of a channel waveguide structure and out-of-plane mirror addressed to the optical path formed in accordance with principles of the present invention.

FIG. 2A is a greatly enlarged, diagrammatic view of a substrate or base coating material having a very uneven, highly irregular topography. FIG. 2B shows the FIG. 2A structure upon which a thick coating layer of material has been placed (e.g. by spin coating) and cured. FIG. 2C shows the same structure but with the thickness of the coating layer having been reduced substantially by an isotropically sourced plasma dry etch, thereby planarizing the FIG. 2A structure.

FIG. 3 is a graph illustrating the relationship between exposure gap and resultant wall slope.

FIGS. 4 through 17 progressively illustrate process steps for forming a channel waveguide structure in accordance with principles of the present invention.

FIGS. 18 through 24 illustrate progressively the steps presently preferred to form an optoreflective structure such as shown in FIG. 1.

FIG. 25 depicts a dual level channel waveguide structure.

FIG. 26 depicts a dual level inverted rib channel waveguide structure.

FIG. 27 is a somewhat diagrammatic view in side elevation and section of a dual layer channel waveguide structure.

FIG. 28A is a somewhat diagrammatic view in side elevation and section of a dual layer channel waveguide structure including optically aligned concave out-of-plane mirrors for coupling the two layers together optically. FIG. 28B is an enlargement of the optically aligned concave out-of-plane mirror pair shown in FIG. 28A.

FIG. 29 depicts a dual level waveguide structure in which an optical signal is transferred form one level to a second by out-of-plane mirrors.

FIG. 30 shows a waveguide of this invention having a lens element for collimating light reflected by an out-of-plane mirror.

DETAILED DESCRIPTION OF PREFERRED EMBODIMENTS

Waveguide Structure 10

FIG. 1 shows a waveguide structure 10, in which e.g. a single mode optical waveguide may be formed either as a channel or as a mesa-plateau relative to adjacent cladding is formed upon a suitable substrate 12. Substrate 12 may be an organic acrylic material, a fiber reinforced resin material of the type used in conventional printed circuit boards, a ceramic material or other substrate, such as polyimide, UV cured polymer substrates, indium phosphide, gallium arsenide, quartz, or crystalline silicon. Substrate 12 may be intrinsically flat or planarized, or it may be planarized in accordance with the method illustrated in FIGS. 2A, 2B and 2C discussed below. A patterned very thin metal film 14 is deposited (e.g. by sputtering techniques) onto substrate 12. Film 14 is provided as a base reference for subsequent alignment of very precise patterning equipment used in the process of locating and forming final channel waveguide structure 10.

Generally, a preferred method of coating substrates is spin coating. Other coating methods including brushing, spraying, etc., may be employed. Thus, "coating" and "coated" as used herein are to be understood in an expansive sense, with spin-coating being preferred. Similarly, a preferred method of curing organic precursor coatings is by exposure to ultraviolet light (UV) of appropriate wavelength, intensity and exposure duration for the material being cured.

An optional base layer 16 of a suitable material, such as polyimide, is coated and cured. A very thin primer layer 18 may be coated onto planarized base layer 16 to promote interlayer adhesion with a first and relatively thick cladding layer 20 of suitable optical quality polymer which is spin coated onto primer layer 18 and cured, for example.

Employing an erodable mask in accordance with methods detailed hereinafter, waveguide 22 is coated onto cladding layer 20. Use of an erodable photolithographic mask to form the geometry of waveguide 22 relative to cladding layer 20 enables a remarkably smooth channel or mesa-plateau waveguide to be realized with a very small cross-sectional area, such as 7.5×7.5 μ. This small dimension for the cross-sectional area of waveguide 22 enables realization of a single mode optical path with relatively low losses because of the smoothness of the defining trench formed in cladding layer 20 or in a waveguide layer in the case of a mesa-plateau waveguide. A final top cladding layer 26 is coated onto the completed waveguide structure 10 to encapsulate it and protect it from the ambient.

An optoreflective structure, such as out-of-plane mirror 28, may be formed to address the optical path of waveguide layer 22. Out-of-plane mirror 28 is formed as a transverse Vee trench across waveguide layer 22 and extends somewhat into cladding layer 20, again most preferably by employing an erodable photoresist mask technique. Two transverse endwalls 30 and 32 are formed as part of the Vee trench, and mirror material is deposited onto only one of the endwalls, e.g. endwall 32. Out-of-plane mirror 28 includes a lower portion 36 and an upper portion 38 extending beyond the boundaries of waveguide layer 22. This arrangement has been found to be very effective for increasing the efficiency of optical energy redirection, as the optical energy beam extends somewhat beyond the boundaries of waveguide layer 22.

The terms "optoreflective" and "mirror" as used herein refer to any surface which, when impinged by light energy, results in specular reflection or redirection of some or all of the light energy. Thus, "mirror" includes a surface or surface boundary between two materials or media of differing refractive indices which causes the redirection or splitting of an impinging optical beam. A split beam may be one which has been divided into two or more components, e.g., one of which is reflected and one of which is transmitted along the original light beam locus or direction. Thus, if cladding or other material of a suitably different refractive index than that of waveguide 22 were placed in the trench between endwalls 30 and 32, endwall 30 will manifest optoreflective properties, and optical beam energy will be directed downwardly toward substrate 12 from endwall 30.

Thin Film Planarization (FIG. 2A-C)

Surface planarization techniques may be employed to produce channel waveguide structure 10 and thin film inverted rib waveguides (as discussed hereinafter) with markedly improved adhesion characteristics. Turning now to FIG. 2A, substrate 40 is depicted as having a very irregular upper surface 42. As shown in FIG. 2B, a suitable acrylic precursor material is then coated onto surface 42 to form a relatively thick layer 44 and then cured, e.g. by exposure to UV energy. An isotropically sourced plasma dry etch is applied to reduce the thickness of layer 44 to a thin film layer 44' as shown in FIG. 2C in order to achieve a thin-film planarization of the irregular substrate 40. In addition to planarization, thin film layer 44' depicted in FIG. 2C manifests superior interlayer adhesion not only to the substrate 40, but also to subsequent layers formed thereon, such as a base layer, a cladding layer, or a waveguide layer.

Materials and formulations especially suitable for use in this invention are described in commonly assigned and copending application of Moyer et al., Ser. No. 07/686,057 (filed Apr. 15, 1991), the disclosure thereof being incorporated hereby by reference.

Erodable Photoresist Masks

It has been discovered that an erodable mask significantly improves performance, quality and processing control over structure formations obtained with a nonerodable mask of the same dimensions. An erodable mask is one which is lost during the processing step or condition in which the waveguide trench is created. This is to be contrasted with a non-erodable mask, which remains substantially intact and unaffected by the same processing condition. An erodable mask offers the advantage that it forms a very smooth surface, as compared to that formed by a non-erodable mask. These differences are readily discernable on SEM photomicrographs at 1000× and 3500× magnification. The immediate benefit of this difference is realization of a waveguide structure which has substantially lower loss of transmitted optical signal along the extent thereof.

There are a number of additional advantages resulting from the use of an erodable mask to form optical waveguide structures. A high degree of control over the wall slope in the waveguide is achievable. This control becomes very important during process steps for forming out-of-plane mirror 28. The slope of the optoreflective surface may be controlled through process conditions during formation of the trench and endwalls 30 and 32. As will be seen hereinafter, not only are practical and controllable out-of-plane mirror structures realized, it becomes possible to couple more efficiently optical signals between different layers of waveguides using aligned pairs of out-of-plane mirror structures. Reflective surfaces which are substantially planar or curved may also be realized in a highly controlled manner with the use of erodable photoresist masks and controllable exposure gaps as graphed in FIG. 3. Curved surface mirrors enable realization of beam spot focus, redirection and control as the beam is moved from one plane into another. Coupled conjugate mirror pairs, such as shown in FIGS. 28A-B (discussed in detail hereinbelow), are practical.

The use of erodable photoresist mask techniques also eliminates many lengthy and capital-expensive process steps and results in a quicker, more efficient, and much more controllable manufacturing process with higher product yield.

Processing Step Sequence—Formation of a Channel Waveguide and Out-of-Plane Mirror The following is a discussion of the steps in the formation of a channel waveguide and out-of-plane mirror, such as shown in FIG. 1. FIGS. 14–17 show the formation of the waveguide proper, while FIGS. 18–24 show the formation of the out-of-plane mirror. The steps are shown in diagrammatic cross-section, with thicknesses greatly exaggerated for clarity and like numerals referring to like elements.

1) FIG. 4 shows a suitably thin opaque film 14' formed onto a suitable substrate 12. Film 14' may be an aluminum metal which is sputter-deposited onto substrate 12 by conventional sputter deposition techniques to a thickness of 1000 Å, for example. Film 14' will subsequently be patterned to form a base reference patterned film 14 for mask alignment during subsequent fabrication steps. All subsequent layers and process steps may thereupon be registered to patterned film 14 and thereby be aligned.

2) In FIG. 5, a photoresist pattern 15 corresponding to the to-be-formed patterned film 14 is defined by coating a thin photoresist layer onto film 14' and patterning the photoresist layer with a photolithographic mask by conventional masking techniques. Additionally, photoresist patterns 15' for defining alignment targets in film 14' may be formed.

3) In FIG. 6, photoresist patterns 15 and 15' and exposed underlying film layer 14' are subjected to a wet etch. Metal not protected by photoresist at 15 and 15' is removed chemically.

4) In FIG. 7, the remaining photoresist pattern 15 is stripped off, leaving behind a completed base reference pattern 14, and several optical alignment targets 17 on substrate 12.

5) In FIG. 8, polyimide base layer 16 is coated onto substrate 12 and patterned film 14 and alignment targets 17 to a desired thickness. This step may or may not be required in order to form a channel waveguide structure in accordance with the principles of the present invention.

6) An ultra thin primer layer 18 of primer precursor is coated onto base layer 16 and cured, preferably using UV light, as shown in FIG. 9.

7) A thick layer of cladding precursor material is coated onto thin primer layer 18 and then cured to form a cladding layer 20 of predetermined optical refractive index, as shown in FIG. 10.

8) In FIG. 11, a thick photoresist layer 21 is coated onto cladding layer 20. Photoresist layer 21 is most preferably a material selected to form an erodable mask which will erode in a controlled fashion during a subsequent oxygen plasma dry etch of a waveguide trench into cladding layer 20.

9) Photoresist layer 21 is then patterned in a manner which selectively exposes underlying cladding layer 20 at the site of a waveguide structure to be formed, in preparation of plasma etching a waveguide trench, as shown in FIG. 12.

10) A reactive ion etch plasma, denoted by the downwardly pointing, parallel arrows in FIG. 13, is applied to patterned photoresist layer 21 and to exposed cladding layer 20 and forms a waveguide trench 23 in cladding layer 20 while simultaneously eroding photoresist layer 21. Since photoresist layer 21 is eroded to a reduced thickness denoted by 21' in FIG. 13, resultant sidewalls of the trench 23 will be smooth and regular.

11) All remaining photoresist material is then stripped off from cladding layer 20 in preparation for application of waveguide material, as shown in FIG. 14.

12) A thick layer 22' of channel waveguide acrylate precursor material having a desired refractive index above that of cladding layer 20 is then coated over cladding layer 20, completely enveloping and filling waveguide trench 23, as shown in FIG. 15. The coated waveguide material is then cured, e.g. by exposure to UV light.

13) In FIG. 16, thick layer 22' is reduced in thickness to match substantially the level of cladding layer 20 adjacent to trench 23, leaving a waveguide 22 occupying only trench 23, by an isotropic oxygen plasma etch.

14) A thin cladding layer 26' is then provided either by coating a thicker layer and reactive ion etching, or by spin-coating, and cured to encapsulate waveguide layer 22 and to provide additional surface above waveguide 30 for an out-of-plane mirror structure, as shown in FIG. 17.

15) As shown in FIG. 18, another layer 27 of photoresist material is then coated, e.g. by spincoating, and patterned on top of cladding layer 26'. In this particular example, photoresist pattern 27 may be defined with a predetermined wall slope (e.g. about 32°–33°) in order to result in desired final wall slopes (e.g. 45°) through etched polymer waveguide layer 22, in the formation of out-of-plane mirror 28. (The view in FIGS. 18–24 is rotated 90° from that of the previous FIGS. 4–17. While in FIGS. 4–17 the trench is viewed end-on, in FIGS. 18–24 the trench is viewed from the side. These views permit better visualization of the respective structures being formed.)

16) A reactive ion etch oxygen plasma is used to etch through the exposed segment of cladding layer 26' and into the underlying segment of polymer waveguide layer 22, as shown in FIG. 19. In this illustration, the etch ratio between photoresist layer 27 and acrylate waveguide material 22 is most preferably about 1:1.6. This etch ratio has been found to yield a wall slope with a desired angle of 45° for endwalls 30 and 32. It should be noted that following the etch step, photoresist layer 27' is considerably reduced in thickness, having been eroded during the etch process, and is now labelled as 27'.

17) As shown in FIG. 20, any remnants of now-eroded photoresist layer 27' are removed chemically in preparation for an optoreflective mirror film deposition.

18) Reflective film 33 of, e.g. thin metal, is sputtered onto the patterned upper surface of thin layer 26' and the Vee shaped transverse opening formed through waveguide layer 22 at the site of out-of-plane mirror 28, as shown in FIG. 21.

19) A thick layer of positive photoresist 35 is then coated onto the structure and patterned to protect the location of the to-be-formed out-of-plane mirror, which will be defined along a selected wall (e.g. endwall 32) of the out-of-plane mirror trench, as shown in FIG. 22. The thickness of positive photoresist 35 may be within a range of between 5 and 50μ, and most preferably about 20μ.

20) The reflective film layer 33 is then etched away, leaving behind only that portion protected by the positive photoresist 35 which thereby defines the mirror 28 on the desired sloped surface 32, thereby leaving the opposite sloped surface 30 of the out-of-plane mirror trench free of all mirror material, as shown in FIG. 23.

21) The patterned photoresist 35 is then chemically removed to expose finished mirror surface 34, as shown in FIG. 24. As can now be seen clearly in FIG. 24, mirror 28 includes a lower segment 36 which extends somewhat below the level of the channel waveguide layer 22, and also includes an upper segment 38 which extends up to and over the top of the thin cladding layer 26'. This arrangement improves optoreflective efficiency, as the optical beam is guided by, but not necessarily constrained within, the cross-section of the waveguide 22.

22) A final layer 26 of cladding material is then spin-coated onto now-completed waveguide structure 10 in order to encapsulate it, including completed waveguide 22 and out-of-plane mirror 28, as illustrated in FIG. 1. It should be noted that although opposite sloped surface 32 of optical waveguide 22's out-of-plane mirror trench has no mirror material remaining, since it has a slightly higher index of refraction than that of the cladding material, it is possible to detect the presence of the opposite sloped surface in the completed structure e.g., through optical diffraction techniques, should it be necessary or useful to analyze or understand the properties of a particular out-of-plane mirror structure.

The processes followed in the fabrication sequence given hereinabove will now be discussed in greater detail. Many widely varying steps and techniques may be employed to realize the desired channel waveguide structures, with or without one or more out-of-plane mirrors, and are deemed to be within the contemplation and scope of the present invention. For example, wafer or substrate 12 may be crystalline quartz, polyimide coated quartz, or polyimide coated crystalline silicon. The optically clear film-forming materials are most preferably UV light polymerizable acrylic based coatings and formulations as more specifically described in the above-referenced copending application of Moyer et al. Alternatively, the material may be spray coated onto the substrate. Thermally curing material may be substituted for the UV polymerizable material, if desired. The waveguide and out-of-plane mirror trenches may be formed without photolithographic masking-etching techniques, as by use of a focused laser beam, electron beam, or charged particle beam.

Metal Deposition

The thin films of metal which are used in the channel waveguide fabrication method of the present invention are preferably vacuum deposited, utilizing conventional vacuum deposition equipment.

Those skilled in the art will appreciate that it is necessary to protect alignment targets 17 which may be provided with base reference pattern 14 (see FIG. 5–7). Unless alignment targets 17 are protected, they will be covered by the subsequent opaque film deposition steps. To avoid covering alignment targets 17 during any metal or opaque film deposition, a small (2.5×2.5 mm) square of adhesive backed Kapton TM polyimide tape is applied to the wafer surface over each alignment target 17 before opaque film deposition. After the opaque film deposition step the polyimide tape is removed. Alignment targets 17 are then clearly visible for the subsequent photoresist exposure step. However, care is taken not to deposit opaque film or metal over alignment targets 17 during any of the subsequent metallization steps, thereby assuring their availability for subsequent process step alignments. If photoresist alone is used during the fabrication process, it is not necessary to provide protection to the alignment targets.

Photolithography

Photoresist processing is a fundamental part of the channel waveguide fabrication process of the present invention. There are four distinctly different photolithographic steps required in the fabrication of a single layer waveguide structure which contains an out-of-plane mirror. These steps include the base reference pattern, step 2; the guide trench pattern, step 8; the out-of-plane mirror base pattern, step 17; and, the out-of-plane mirror metal pattern, step 21. With a process which does not use a durable (non-erodable) mask for the guide trench, the photoresist is coated to a suitable thickness so that it is not completely eroded before the trench is etched to a desired depth.

Base Reference Pattern

There are two reasons for the base reference pattern. First, during processing a common reference point must be defined in order to perform all layer-to-layer registrations. Some of the structure formations which must be aligned to are transparent and cannot be seen on the mask aligner apparatus. Second, after the waveguide structure has been fabricated and has been diced from the wafer, the end of each waveguide must be located in order to perform a gross alignment such as to an optical fiber. In order to perform in-process as well as post-fabrication alignments, it is necessary to define all the waveguide structures and a set of alignment targets as a base reference pattern. All of the structures which are fabricated on the wafer are aligned to the same set of alignment targets in the base reference pattern.

The principal requirement for patterning the base reference layer is that photoresist features of nominal waveguide dimensions are able to be defined. This is accomplished with a thin layer of positive resist. Development of the photoresist pattern is performed conventionally in a temperature controlled recirculating bath.

For example, the base reference pattern photoresist steps are carried out with the aid of a photoresist coater, a mask aligner, UV exposure, and a recirculating develop bath. Most preferably, standard photoresist processing techniques and equipment are used.

Guide Trench Pattern

The purpose of the guide trench pattern (FIG. 12) is to create an etch mask for the underlying cladding material. Good critical dimensional control at the guide trench pattern is necessary in order to insure that single mode optical guiding occurs in the final channel waveguide structure. For a guide trench pattern which uses photoresist as an erodable mask, the photoresist msut be coated sufficiently thick so as not to be fully eroded before the required depth of the trench is reached. When so coated, the photoresist continues to function as a mask throughout the erosion process step. The target widths for the channel waveguide structures are typically $7.5 \pm 0.5\mu$.

Mirror Base Pattern

The mirror base pattern (FIG. 18) as formed in photoresist layer 27', is used as an erodable plasma etch mask to create wall surfaces 30 and 32 (FIG. 19), one of which is chosen for out-of-plane mirror 28 across underlying cladding/waveguide acrylate layers 20, 22 and 26'.

Two important aspects of this patterning step are: First, having a sufficiently thick photoresist layer 27 (FIG. 18) so as to be able to etch the mirror base region to a desired proper depth and not expose the protected portions of the wafer, and second, providing the photoresist features with a predetermined proper wall slope in order to produce the desired wall slope in the underlying acrylate layers 20, 22, and 26'.

Standard coating techniques for thick resist films may be employed to provide the mirror base pattern. The photoresist for the mirror base pattern is spin-coated to form a suitable thickness such as approximately $20\mu$, although the thickness may lie in a range extending between 5 and $50\mu$. A photoresist of high solids content is dispensed onto the wafer rotating in a resist coater spinning at low rpm, such as 400 rpm. The photoresist is then spread by increasing the resist coater rotational speed to e.g. 1000 rpm for a suitably short time interval in order to achieve uniform spreading of the material. It is then spun to the desired thickness by rotating for an additional time period and at a suitable speed. A soft bake procedure is then carried out conventionally to cure the photoresist layer.

The resultant thickness places some very special demands upon the photoresist, including the selection of the resist material itself. Principally, while the photoresist layer must be able to be coated sufficiently thick in order to achieve the proper etch depth, it must also be able to be exposed fully during a single exposure operation. A double exposure strategy is to be avoided as likely to produce an unacceptable wall slope. We have discovered that a photoresist with the characteristic of high bleachability upon exposure to ultraviolet energy, such as Dynachem (formerly MacDermid) EL-2025-42 photoresist (42% solids with a range of coating thicknesses between 6 and $20\mu$), is very well suited for this particular step.

Exposure is carried out at an intensity which is appropriate for the thickness of the photoresist film layer and at a mask gap which is also appropriate for the thickness of the layer and the desired wall slope. Photoresist EL-2025-42 has the characteristic of becoming very transparent (95% optical transmissivity) upon exposure to UV radiation in the range of 340–420 nm. As the thick photoresist layer is exposed, the upper exposed region of the resist bleaches to become more transmissive, thereby enabling a greater amount of the UV energy to penetrate deeper into the photoresist layer. This bleaching characteristic has been determined not to be as pronounced in other photoresists. Following the exposure step, the photoresist is conventionally developed by placement in the develop bath for a time interval appropriate to the photoresist thickness, etc.

When the etch ratio between the photoresist and the acrylate is known, it is possible to create the desired wall slope in the underlying acrylate by starting with the proper wall slope in the photoresist. Adjustment of the exposure gap between the mask held in the mask aligner and the surface of the photoresist layer on the wafer is the mechanism by which the wall slope in the photoresist is controlled. The relationship between the exposure gap and resultant wall slope of the photoresist is shown in the FIG. 3 graph.

In order to produce an out-of-plane mirror in the acrylate layer with a slope of 45° to the plane of the wafer, photoresist 27 should have wall slopes of about 32°–33°, as shown in FIG. 18. In one example, the exposure gap for photoresist features with wall slopes of 32° is $340\mu$ and a suitable exposure dose for the mirror base pattern is about 627 mJ/cm$^2$. Control of the wall slope of photoresist 27 is critical to proper functioning of resultant out-of-plane mirror 28. The inventive process is currently capable of producing photoresist features having wall slopes between about 32° and 85°. These results have been achieved with a conventional mask aligner, such as the Karl Suss MA150 mask aligner. Other available mask aligners will work with results directly related to their tolerances and configurations.

Mirror Metal Pattern

Patterning of the photoresist on the sloped mirror base acrylate, step 19 and FIG. 22, presents a unique photolithographic challenge. In most situations where step coverage by the photoresist is concerned it is topographies above the average surface of the wafer which must be patterned. In the case of the mirror metal pattern, however, it is defining the mirror at the bottom of the mirror well which is most important. It is critically important that the mirror metal be patterned so as not to extend up and onto the opposite surface of the mirror well. This would result in blockage of the light in the waveguide.

The mirror well in this example is $14\mu$ deep. Not only must the photoresist fill the mirror but it must planarize the surface of the wafer. Planarization is necessary to prevent unwanted flow patterns from occurring as the photoresist covers the pitted surface. These flow patterns result in uncontrolled masking and unwanted metal streaks across the wafer. In order to planarize the mirror well, the photoresist coating for this purpose must be at least $8\mu$ thick. Again, photoresist EL-2025-42 is preferred. The entire photoresist thickness down into the mirror well may be patterned with a single exposure.

Example: Mirror Metal Pattern

The resist coat is applied using the same conditions as set forth above for the mirror base pattern. The exposure step is carried out with an appropriate intensity, e.g. 41.5 mW/cm$^2$ and with an appropriate energy level, e.g. 500 mJ/cm$^2$. The exposure mode is preferably a soft contact with the wafer. A conventional pattern developing step is employed and may be the same process as used for the mirror base photoresist step above.

Wet Chemical Etch

Appropriate conventional wet chemical etch processes take place in the formation of channel waveguide structures in accordance with the present invention. For example, if aluminum is used for base reference patterned film 14, an aluminum etch is carried out, as illustrated in FIG. 6. In another example, gold is used for the optoreflective out-of-plane mirror 28, and a conventional gold etch process is carried out as shown in FIG. 23.

Spin Coat and UV Cure

Preferred embodiments of the present invention employ three types of acrylic materials, which are used to form ultra thin primer layer 18, cladding layers 20, 26' and 26, and waveguide layer 22. Primer layer 18 is used to enhance the adhesion of the first layer of cladding material to the substrate. If desired, a primer layer may be applied before all coatings, with the exceptions that it is not applied prior to the application of waveguide layer 22 nor is it applied prior to the application of cladding layers 26 and 26'. Especially suitable acrylic materials are described in the above-referenced copending application of Moyer et al. A spin coating program for each of the acrylic materials is preferably developed which takes into account the viscosity and the target thickness desired for each material. All these materials generally receive the same UV curing treatment. A preferred curable composition (all percentages are by weight) for the cladding precursor material contains 30% Novacure 3700, 20% Ebecryl 1830, 45% trimethylolpropane trimethacrylate, 5% hexane diol diacrylate, 1.8% Darocur 1173 and 0.2% benzophenone. A preferred curable composition for the light guide precursor material contains 45% Novacure 3700, 35% trimethylolpropane trimethacrylate, 20% hexanediol diacrylate, 1.8% Darocur 1173 and 0.2% benzophenone. A preferred curable composition for use as the primer precursor contains 98% hexanediol diacrylate, 1.8% Darocur 1173 and 0.2% benzophenone.

Although the acrylic materials used to form preferred waveguide structure 10 receive the same sequence of processing steps it is noteworthy that the material for acrylate waveguide 22 is applied much thicker than is needed in the final channel waveguide 22. The guide acrylate is applied sufficiently thick so as to not only fill the empty trenches 23 which have been etched into cladding layer 20 but it must also planarize the uppermost surfaces of cladding layer 20 above trenches 23. During the development of the channel waveguide structures of the present invention, a particular rotational speed for a given viscosity of materials was noted, above which the filled trenches would start to empty. This particular rotational speed is termed the "depletion point speed" for the material. In the development of a spin coating process for a given guide acrylate a spin speed is determined which is well below the depletion point speed but which does not add excessive thickness to the coating. Additional thickness in the guide acrylate coating may be removed by additional processing time in the plasma etcher.

While a manual wafer handling system may be employed, a cassette to cassette wafer processing system is preferred. The system preferably automatically dispenses the acrylate onto the wafer, cleans the backside of the wafer, and removes the edge bead otherwise formed by spin coating. These features increase throughput, improve quality as seen by reduced particle contamination, and result in greater wafer to wafer uniformity.

The importance of the removal of the edge bead during spin coating cannot be underestimated. The subsequent photolithographic step to define the waveguide trench is performed in soft contact with the wafer and the mask aligner. When not removed, the edge bead has been measured as being in excess of 30μ. Unless removed, this edge bead will interfere with the exposure gap between the wafer surface and the photomask, and result in a loss of critical dimension control at a point in the process when it is most important.

A high intensity cassette-to-cassette UV curing system is preferred to carry out the UV curing steps when using a UV curable system or materials. Thorough and uniform UV curing of the acrylic film layers is a fundamental requirement in the fabrication of channel waveguide structures in accordance with the present invention.

Dry Etch

Dry etch plasma processing is preferably carried out within a suitable parallel plate reactive ion etch (RIE) system, such as a Plasma Therm Model 3080. Anisotr Anisotropic (directional) etch conditions are used to create waveguide trenches 23 and the base of out-of-plane plane mirror bases 28. Isotropic (non-directional) etch conditions are used to reduce and planarize films to a desired thickness, in FIGS. 2C and 16, for example. Etch directionality may be achieved through control of power, pressure, and flow rate of oxygen during each etch process. The anisotropic etch typically runs at a relatively low pressure while starving the plasma for oxygen. The isotropic etch typically runs at higher pressure while providing an abundant supply of oxygen. In both etch processes oxygen is used as the preferred (and only) process gas within the reaction chamber.

Maintenance of critical dimensions during the anisotropic etch for the waveguide trench is necessary in order to maintain single mode guiding in the final structure. Etch back is measured following the removal of the etch mask. Minimizing the surface roughness which occurs during both the trench etch, and during the mirror base etch, is an important process consideration.

From photomicrographs comparing metal masking to photoresist masking, surface roughness values of 1.25μ of roughness in the upper non-erodable mask trench etch segment were determined to be present, compared to 0.25μ of roughness in the much smoother and more even lower erodable resist masked segment. The additional roughness seen in the metal mask etch is due to redeposition of metal in the area being etched, which causes micromasking and the additional roughness. At present a graphite cover plate is used to cover and thus eliminate the large aluminum surface of the cathode element within the reaction chamber of the etcher.

As already noted above, during the spin coating of the guide acrylate, it is not possible to coat the material sufficiently thin while simultaneously filling and planarizing the guide trenches. It therefore becomes necessary to spin coat a thicker layer of resin material, which fills and planarizes the trench topography, and then reduce the layer to the required thickness via the isotropic etch process.

Multi-Layer Channel Waveguide Structure

With reference to FIG. 25 a multi-level channel waveguide structure 100 includes a wafer 102, a base layer 103 (which may be optionally provided, e.g. for planarization), a first, inner cladding layer 104, a thin film inner-layer 106, and a second, outer cladding layer 108. A first channel optical waveguide 110 is defined at first cladding layer 104, and a second channel optical waveguide 112 is defined at second cladding layer 108. With reference to FIG. 26 an inverted rib (mesa-plateau) waveguide structure 1 is shown as having elements which are the same as the elements of waveguide structure 100 and which bear the same reference numerals. In forming the inverted rib waveguide 126, a thin film layer 128 of excess guide material is formed on inter-layer 106, and a similar thin film layer 132 is formed over second cladding layer 108 incident to the formation of a rib waveguide 130 at the second layer.

In FIG. 27, a light source, such as a single mode optical fiber 190, is coupled in plane with the edge of a channel waveguide layer 174, formed in accordance with the above described method upon a substrate 160 having a base layer 164 and cladding layers 166 and 166'. Light energy (denoted by the arrows) leaving the light transmissive portion of the fiber 190 enters the waveguide 174 and is conducted therealong until reaching an out-of-plane mirror structure 178, at which point the light energy is redirected in a perpendicular (upward) direction and out of the original plane of the waveguide 174.

In FIG. 28A (like numerals to FIG. 27 referring to like elements), a concave out-of-plane mirror formation process employing an isotropic etch condition has been used to fabricate two coupled conjugate mirror structures 194 and 198 which are provided to couple light energy from a waveguide 192 lying in a first plane to a second channel waveguide 196 lying in a second plane above the plane of first waveguide 192. Alternatively, where desired, a convex mirror can be similarly made. In this example, erodable masks have been used, and isotropic etch conditions have been provided in order to create controlled curved surfaces for the mirrors 194 and 198 (it being remembered that flat mirror surfaces are created by anisotropic etch conditions, as explained hereinabove). An enlarged view of the resultant coupled conjugate mirror structure is depicted in FIG. 29B. Relative curvatures of the mirrors 194 and 198 and the spacing between them will determine location of a common focal point therebetween. With conjugate curved mirrors, it is practical to enlarge or diminish the cross sectional area of the optical beam from the one path 192 to the other path 196, by controlling the location of the focal point, by controlling spacing and relative curvatures of the mirrors, for example.

FIG. 29 is similar to FIG. 28A except that coupled mirrors 204 and 206 are planar structures which are positioned to couple or transfer light energy from waveguide 202 lying in a first plane to a waveguide 207 lying in a second plane. Substrate 200, base layer 201, and cladding material 208 are as previously described in reference to the previous figures.

The formation of two substantially parallel, adjacent waveguide trenches which are separated by a very thin wall (e.g. 1.25 micrometer) of cladding material and which together form and define an evanescent optical field coupler structure is readily discernible by photomicrographs. This particular arrangement, formed in accordance with the methods of the present invention, yields an optical coupler which effectively couples energy from one of the waveguides into the other waveguide. Thus, from the foregoing discussion, it is apparent that optical waveguide structures which can be formed in accordance with the methods of the present invention, include but are not limited to, evanescent field couplers, optical vias (i.e. out-of-plane mirrors), Y-junction power dividers or splitters, wavelength division multiplexers, optical clock signal distributors and branching Michelson interferometers.

Lens Element

A lens element may be used to improve the input or output of light energy in the waveguides of this invention, especially the latter. FIG. 30 shows a waveguide 215 comprising a base substrate 220 supporting a cladding medium 221, containing therein a higher refractive index waveguide medium 222. Input light (ray A) is reflected by out-of-plane mirror 223 in the direction of ray A'. Any light which would otherwise have been scattered (thereby diminishing the efficiency of the out-of-plane energy transfer) is collected and collimated by lens element 224 as rays B, to produce a better defined optical signal. Where a photodetector, which requires precision alignment, is used to receive the output signal reflected off out-of-plane mirror 223, the advantages of such a lens element are self-evident.

The lens element may be fabricated by a photolithographic process. A photoresist feature is precisely defined at the desired location relative to the out-of-plane mirror. The photoresist, which is typically an organic polymer, is heated above its melting temperature, such that its top surface flows into a convex lens shape, the footprint of the original resist feature remaining unchanged. The curvature of the top surface of the lens element may be controlled by surface tension and the length, width, and thickness of the original photoresist feature.

Alternatively, the lens element may be produced in a subsequent RIE plasma etching step which reproduces the photoresist image in the underlying cladding layer.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. An optoreflective structure for reflecting an optical signal following a path defined by an optical waveguide means, the structure comprising
    a transverse gap defined transversely across the waveguide means so as to present across the optical path a forward surface and a rearward surface and
    optoreflective means covering at least a substantial portion of the rearward surface for changing said direction of the optical signal, whereby a portion of the forward surface lying in the path transmits the optical signal without substantial redirection or scattering thereof;

wherein the gap is further defined by a floor and a shelf adjacent to the rearward surface, and wherein the optoreflective means covers a portion of the floor and the shelf adjacent to the rearward surface.

2. The structure set forth in claim 1, wherein the waveguide means has been separated transversely between the forward surface and the rearward surface, and a portion of the waveguide means including the forward surface has been removed from the structure.

3. The structure set forth in claim 1, wherein the rearward wall surface is substantially planar.

4. The structure set forth in claim 1, wherein the rearward wall surface is curved.

5. The structure set forth in claim 1, further including an optical cladding means for filling the gap.

6. The structure set forth in claim 1, wherein the optoreflective means comprises a thin reflective film.

7. The structure set forth in claim 1, wherein the thin reflective film is coated onto the rearward surface by vacuum sputtering.

8. The structure set forth in claim 1, comprising at least one of evanescent field coupler, optical via, Y junction power divider, wavelength division multiplexer, optical clock signal distributor and branching Michelson interferometer.

9. The structure set forth in claim 1, further comprising a lens for collimating the optical signal reflected by the optoreflective means.

* * * * *